(12) United States Patent
Balfanz et al.

(10) Patent No.: US 7,549,047 B2
(45) Date of Patent: Jun. 16, 2009

(54) METHOD AND SYSTEM FOR SECURELY SHARING FILES

(75) Inventors: Dirk Balfanz, Menlo Park, CA (US); Teresa Lunt, Palo Alto, CA (US); Diana Smetters, San Francisco, CA (US); Ken Conley, Mountain View, CA (US); Paul Stewart, Sunnyvale, CA (US); Steve Cousins, San Jose, CA (US); Bryan Pendleton, Menlo Park, CA (US)

(73) Assignee: Xerox Corporation, Norwalk, CT (US)

( * ) Notice: Subject to any disclaimer, the term of this patent is extended or adjusted under 35 U.S.C. 154(b) by 475 days.

(21) Appl. No.: 10/301,931

(22) Filed: Nov. 21, 2002

(65) Prior Publication Data

US 2004/0103280 A1 May 27, 2004

(51) Int. Cl.
*H04L 9/32* (2006.01)
(52) U.S. Cl. .................. 713/169; 713/165; 713/170
(58) Field of Classification Search .................. 713/173, 713/169, 165, 170
See application file for complete search history.

(56) References Cited

U.S. PATENT DOCUMENTS

| | | | |
|---|---|---|---|
| 5,408,250 A | 4/1995 | Bier | |
| 5,519,778 A | 5/1996 | Leighton et al. | |
| 5,539,824 A | 7/1996 | Bjorklund et al. | |
| 6,064,741 A | 5/2000 | Horn et al. | |
| 6,075,860 A | 6/2000 | Ketcham | |
| 6,105,133 A | 8/2000 | Fielder et al. | |
| 6,243,373 B1 | 6/2001 | Turock | |
| 6,243,772 B1 | 6/2001 | Ghori et al. | |
| 6,253,217 B1* | 6/2001 | Dourish et al. | 715/500 |
| 6,366,654 B1 | 4/2002 | Cramer et al. | |
| 6,396,612 B1* | 5/2002 | Bjorndahl | 398/121 |
| 6,938,042 B2* | 8/2005 | Aboulhosn et al. | 707/10 |
| 6,963,882 B1* | 11/2005 | Elko et al. | 707/200 |
| 2001/0048744 A1 | 12/2001 | Kimura | |

(Continued)

FOREIGN PATENT DOCUMENTS

WO      WO 99/41876      8/1999

OTHER PUBLICATIONS

Balfanz, D. et al., "Talking To Strangers: Authentication in Ad-Hoc Wireless Networks," Xerox Palo Alto Research Center, [Retrieved from the Internet at http://www.isoc.org/isoc/conferences/ndss/02/proceedings/papers/balfan.pdf on Feb. 18, 2002] (Posted on the Internet on Feb. 11, 2002).

(Continued)

*Primary Examiner*—Nasser G Moazzami
*Assistant Examiner*—Fikremariam Yalew
(74) *Attorney, Agent, or Firm*—Nixon Peabody LLP

(57) ABSTRACT

A system and method for sharing files securely includes server software on a first device configured to communicate with server software operating on one or more other preauthorized devices, such as a second device. The servers communicate with each other securely using cryptographic information exchanged during a preauthorization phase using a range-limited communication channel. The server on the first device obtains file information from the other preauthorized device(s) and combines the information with local file information from the first device. This combined file information is sent to client software operating on the machine, which presents the combined file information to users.

21 Claims, 9 Drawing Sheets

U.S. PATENT DOCUMENTS

| | | | |
|---|---|---|---|
| 2002/0061748 | A1 | 5/2002 | Nakakita et al. |
| 2002/0065065 | A1* | 5/2002 | Lunsford et al. ............ 455/411 |
| 2002/0094087 | A1 | 7/2002 | Dellmo et al. |
| 2002/0147920 | A1 | 10/2002 | Mauro |
| 2002/0159598 | A1 | 10/2002 | Rubinstein et al. |
| 2003/0014646 | A1 | 1/2003 | Buddhikot et al. |
| 2003/0051140 | A1 | 3/2003 | Buddhikot et al. |
| 2003/0078072 | A1 | 4/2003 | Serceki et al. |
| 2003/0081774 | A1 | 5/2003 | Lin et al. |
| 2003/0117985 | A1 | 6/2003 | Fujii et al. |
| 2004/0088548 | A1* | 5/2004 | Smetters et al. ............ 713/175 |
| 2004/0103280 | A1 | 5/2004 | Balfanz et al. |

OTHER PUBLICATIONS

Lopes, C. et al., "Aerial Acoustic Communications," IEEE Workshop on Applications of Signal Processing to Audio and Acoustics, pp. 21-24, (2001).

Whitehead, Jr., E. et al., "Lessons from WebDAV for the Next Generation Web Infrastructure," Department of Information And Computer Science, University of California [Retrieved from the Internet at http://www.ics.uci.edu/~ejw/http-future/Whitehead/http_pos_paper.html on Sep. 20, 2002].

Fielding, R. et al., "Web-Based Development of Complex Information Products," Communications Of The ACM, vol. 41, No. 8, pp. 84-92 (1998).

Dridi, F. et al., "How to Implement Web-Based Groupware Systems Based on WebDAV," Published in Proc. of WETICE 99, IEEE 8$^{th}$ Intl. Workshops on Enabling Technologies: Infrastructure for Collaborative Enterprises, Standford, CA, pp. 1-7 (1999).

Whitehead, J. et al., "WebDAV, A Network Protocol for Remote Collaborative Authoring on the Web," pp. 1-21 (1999) [Retrieved from the Internet at http://citeseer.nj.nec.com/whitehead99webdav.html on Mar. 11, 2003].

U.S. Appl. No. 10/066,699 to Balfanz et al., filed Feb. 6, 2002.

U.S. Appl. No. 10/289,528 to Smetters et al., filed Nov. 6, 2002.

"Using Speakeasy for Ad Hoc Peer-to-Peer Collaboration", Edwards et al., Nov. 16, 2002.

Geer, Daniel E. et al. "Token-Mediated Certification and Electronic Commerce", Proceedings of the Second USENIX Workshop on Electronic Commerce, Oakland, California, Nov. 1996.

Kindberg, Tim and Zhang, Kan "Validating and Securing Spontaneous Associations between Wireless Devices" HP Laboratories, Palo Alto, HPL-2002-256, Hewlett-Packard Company, Sep. 12, 2002.

"ACC: Automatic Cryptographic Configuration of Embedded Devices" XML Trust Center White Paper 19$^{th}$ Feb. 2002, http://research.verisign.com/Papers/ACC1.html.

U.S. Appl. No. 60/480,909 entitled "Methods and Apparatus for Establishing and Using a Secure Credential Infrastructure" to Diana K. Smetters et al., filed Jun. 24, 2003.

U.S. Appl. No 10/231,194 entitled "Apparatus and Methods for Providing Secured Communication " to Dirk Balfanz et al., filed Aug. 30, 2002.

U.S. Appl. No. 10/424,191 entitled "System and Method for Establishing Secondary Channels" to Conley et al.

U.S. Appl. No. 10/656,439 entitled "Method, Apparatus, and Program Product for Securely Presenting Situation Information" to Smetters et al.

U.S. Appl. No. 10/656,551 entitled "Method, Apparatus, and Program Product for Provisioning Secure Wireless Sensors," to Smetters et al.

Asokan et al., "Key Agreement in Ad-Hoc Networks," *Computer Communications*, Elsevier Science Publishers BV, Amsterdam, NL, 23(17):1627-1637 (2000).

Bardram et al., "Context-Aware User Authentication—Supporting Proximity-Based Login in Pervasive Computing," A.K. Dey et al. (Eds.): UbiComp 2003, LNCS 2864, pp. 107-127 (2003).

Kindberg et al., "Secure Spontaneous Device Association," A.K. Dey et al. (Eds.): UbiComp 2003, LNCS 2864, pp. 124-131 (2003).

Schneier, B., "Applied Cryptography: Protocols, Algorithms, and Source Code in C," in Section 8.3 "Transferring Keys," John Wiley & Sons, New York, US, (1996).

Stajano et al., "The Resurrecting Duckling: Security Issues for Ad-hoc Wireless Networks," AT&T Software Symposium, 'Online!' pp. 1-8 (1999).

* cited by examiner

FIG. 3A
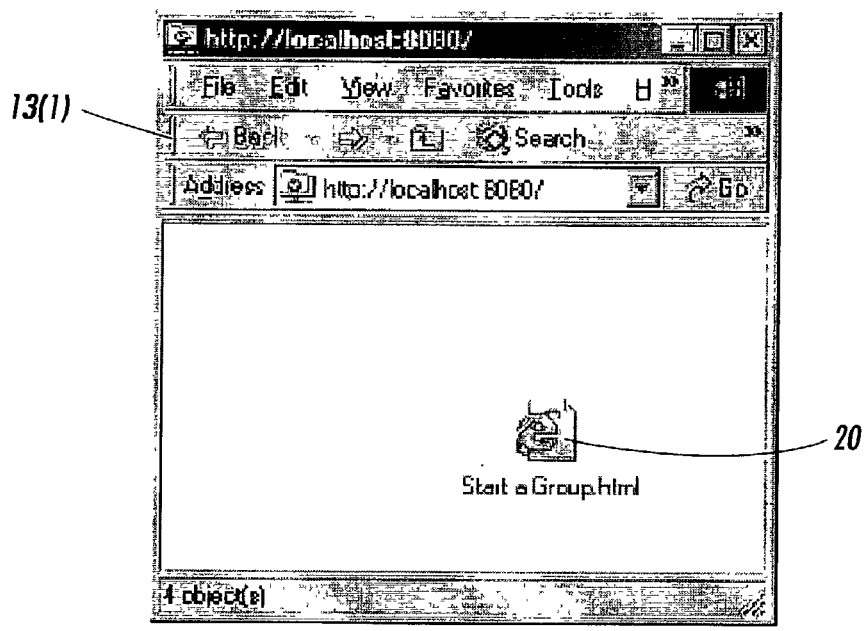
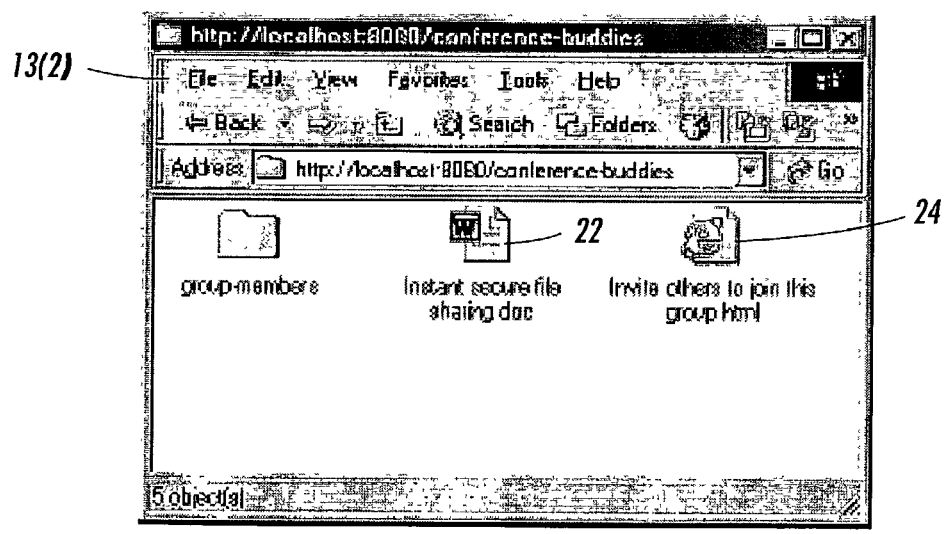
FIG. 3B

METHOD AND SYSTEM FOR SECURELY SHARING FILES

FIELD

This invention relates generally to digital data processing among distributed digital processing systems and, more particularly, to a method and system for enabling devices to create virtual file servers representing files stored at one or more other devices, and enabling preauthorized devices to access and share those files securely.

BACKGROUND

Sharing documents or files securely currently involves complex and tedious procedures that are often costly and error-prone. There are several approaches available for sharing documents, except none offer an adequate means for easily sharing documents in a secure manner. For instance, one approach involves sending documents as secure electronic mail ("e-mail") message attachments. This approach involves a great deal of administrative overhead, such as requiring operators to apply for trusted certificates and to exchange the certificates and keys before they can send the messages. Thus, much effort is expended in simply setting up the security protocols instead of towards the goal of sharing files. Further, both parties must have access to their e-mail server, which may not always be possible in real-time. Also, the delays and bandwidth requirements involved in transporting the documents may be unacceptable due to network congestion. For instance, some recipients may receive their documents too late because their e-mail servers were slow.

Additionally, this approach is not effective in a collaborative environment. For instance, if one member of a collaborative group desires making a change to a shared document, they need to send the revised copy to all of the group members, who then must save the copy. This may cause a great deal of confusion since group members may have multiple versions of the same document at one time. One could envision an e-mail in-box that sorts and displays received e-mail messages based upon a time of receipt. If the e-mail messages were transmitted at varying speeds, then it would be difficult to determine whether the displayed order of received messages accurately reflects the order they were originally sent in.

Another approach uses a central server, such as an FTP server, to allow clients to access and securely share documents stored on the server. But these servers can be single points of failure, and often require a high degree of administrative overhead to setup the security protocols. Worse yet, central servers may not even be available in ad-hoc distributed network environments. With the advent of devices and services that can communicate in a fluid, ad-hoc manner, a central server scheme is inadequate for sharing documents securely.

SUMMARY

A method and a program storage device readable by a machine and tangibly embodying a program of instructions executable by the machine in accordance with embodiments of the present invention include preauthorizing a first device to communicate with at least one of a second device and a plurality of other devices by exchanging credentialing information via a secure network. The method further includes accessing at the first device at least one file accessible to the first device through a first file system, where access to the at least one file is provided to the first file system via a secure channel over an unsecure network by at least one of the second device and the other devices upon the first file system authenticating itself using the credentialing information to a second file system on the second device or the other devices which store the at least one file being accessed.

A system in accordance with embodiments of the present invention includes a preauthorization system that preauthorizes a first device to communicate with at least one of a second device and a plurality of other devices by exchanging credentialing information via a secure network. Further, an access system enables the first device to access at least one file accessible to the first device through a first file system, the first file system being provided access to the at least one file by at least one of the second device and the other devices upon the first file system authenticating itself using the credentialing information via a secure channel over an unsecure network to a second file system on the second device or the other devices which store the at least one file being accessed.

The present invention provides a number of advantages, including solving the above-noted deficiencies inherent to current approaches for attempting to share resources, such as files, securely in a collaborative setting. Users can quickly and easily create one or more virtual folders on their devices, such as laptops, for securely sharing files with users in a group. Files stored at the one or more devices appear to the users in the group as though they are present on each of their respective devices. Further, the present invention advantageously makes file transfers implicit, as opposed to current file sharing methods that require explicit file transfers, as in the case where files are shared using central FTP servers and where files are transferred as e-mail attachments.

BRIEF DESCRIPTION OF THE DRAWINGS

FIGS. 3A-3B are exemplary user interfaces used in the system shown in FIG. 1;

DETAILED DESCRIPTION

A file sharing method and system 10 in accordance with embodiments of the present invention are shown in FIGS. 1-8. In embodiments of the present invention, system 10 includes laptops 12(1), 12(2) and 12(3) and network 14, although the system 10 may include other types and a lesser or greater number of devices and networks. A method includes creating a file sharing group associated with one or more laptops 12(1), 12(2) and 12(3). In exemplary embodiments, one or more files stored on the laptops 12(1), 12(2) and 12(3) are shared, and the laptops 12(1), 12(2) and 12(3) can access the files. Although the files are stored at one or more machines, they appear to system 10 users as if they are present on their respective machines. The system 10 and method in accordance with embodiments of the present invention has a number of advantages, including making it easy for users to securely share resources, such as files. Additionally, the security mechanisms employed in embodiments of the present invention work implicitly and "under the hood" of what users see, and make it difficult for eavesdroppers to listen in on.

Figure 1:
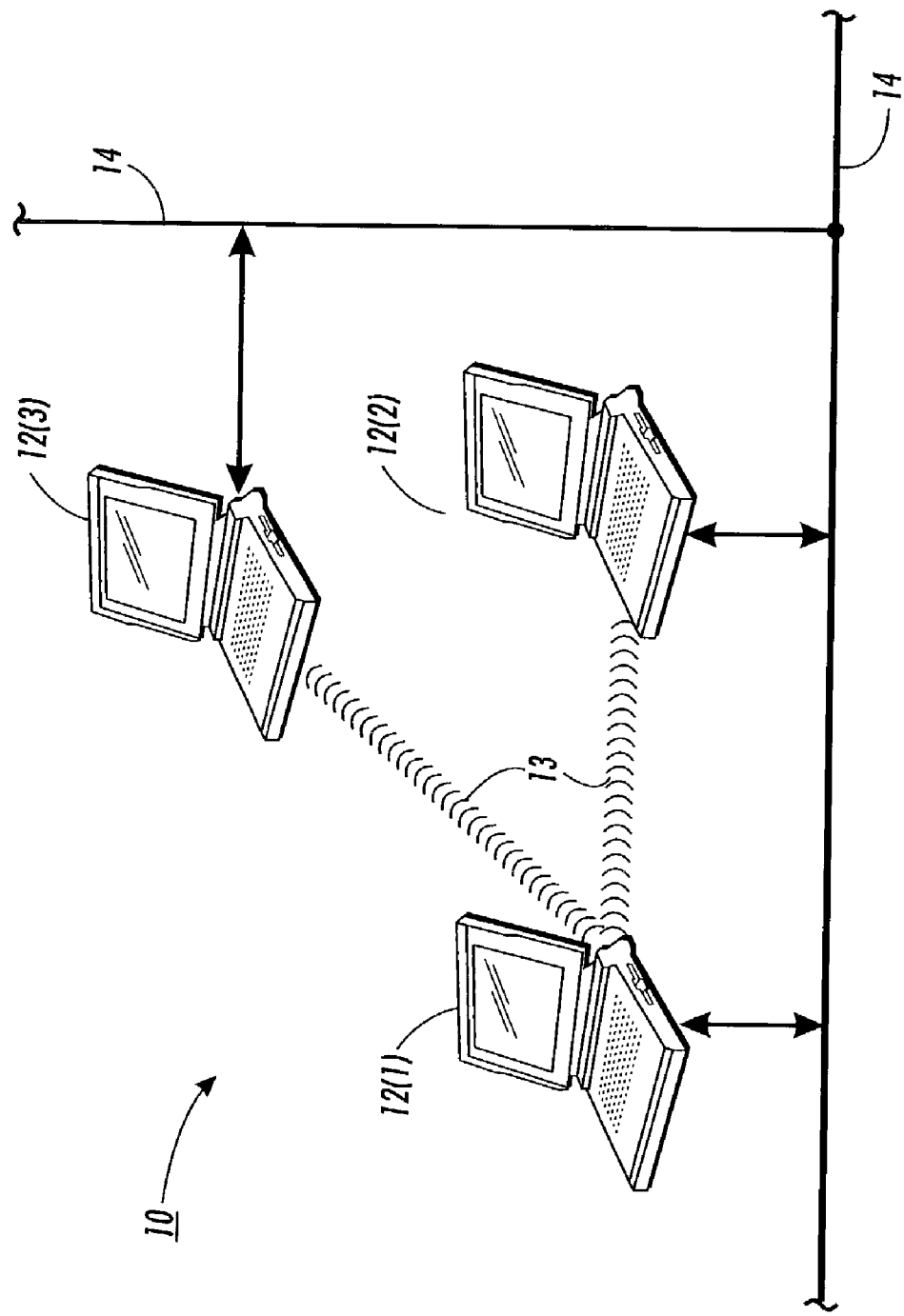
FIG. 1 is a diagram of a system for sharing files in accordance with embodiments of the present invention.

Referring more specifically to FIG. 1, laptops 12(1), 12(2) and 12(3) each comprise a portable computing device that performs a variety of functions, such as file management, word processing, information processing and display, electronic messaging, telephony, facsimile transmissions, or networking, although other types and numbers of devices can be used. Laptops 12(1), 12(2) and 12(3) each include a processor, an I/O unit, a memory and mechanisms for reading data stored in the memory, which are coupled together by one or more buses, although other coupling techniques may be used. These elements are used by each of the laptops 12(1), 12(2) and 12(3) to store and process instructions in accordance with embodiments of the present invention as described and illustrated further herein.

The memory comprises volatile memory and non-volatile memory. The volatile memory comprises random access memory, although dynamic random access memory or flash memory may be used, while the non-volatile memory comprises a fixed data storage medium, such as a hard-disk, although a portable data storage medium may be used, such as a floppy-disk, compact-disc, digital-video disc, magnetic tape or optical disc. The memory stores instructions and data for performing the present invention for execution by the processor, although some or all of these instructions and data may be stored elsewhere.

Further, the respective memory of each laptop 12(1), 12(2) and 12(3) stores file server software application instructions. In embodiments of the present invention, these server software instructions when executed by one or more laptops 12(1), 12(2) and 12(3) operate a WebDAV compatible server, although other file system software applications may be used, such as FTP, CIFS/SMB, NFS, Appletalk and P2P fileshares (e.g., GNUtella, Napster, Kazaa). WebDAV server software is used in embodiments of the present invention for a variety of reasons, such as it does not consume large amounts of system resources and does not demand a great deal of user involvement to operate on devices, such as the laptops 12(1), 12(2) and 12(3). Further, each of the server applications residing and operating on the laptops 12(1), 12(2) and 12(3) can communicate and share file information with each other as described in further detail herein below in connection with step 600.

The server software is configured on each machine, such as laptop 12(1), to be able to communicate with a corresponding server software application operating on one or more other machines, such as laptops 12(2), 12(3). Moreover, the communications between the server software applications operating on one or more laptops 12(1), 12(2) and 12(3) are encrypted, as will be described in further detail herein below.

Moreover, the server software is configured to send information about the local files stored at the particular machine that the server software resides on, such as laptops 12(1), 12(2) and 12(3), to the other server applications operating on other machines, such as laptops 12(1), 12(2) and 12(3). In turn, the server software residing on a machine, such as laptop 12(1), is configured to receive information from the server applications operating on other machines about the files stored at those machines. Further, the server software on each machine is configured to communicate the information about its local files and the files stored at the other machines to client software operating on that machine.

The client software is stored in the memory of each machine, such as laptops 12(1), 12(2) and 12(3). The client software on each machine can communicate with the server software on that same machine. Additionally, the client software residing on each machine, such as laptop 12(1), should be configured to combine information about the local files stored at that machine with information about files stored at other machines, such as the laptops 12(2), 12(3).

Additionally, the client software in this example can understand a WebDAV protocol, although the software may understand other types of protocols including BSCW, Samba and FTP. Further, the client software in embodiments of the present invention comprises a Web browser, such as MS Internet Explorer™ ("IE"), which provides a user interface for enabling users to browse the contents of the combined files of the file sharing group, although other WebDAV compatible client software may be used including Nautilus, WebDrive 5.1, Konqueror for KDE 3.0, Finder for the Apple operating system. Although exemplary version numbers are provided above for the IE™ Web browser along with trademarked software package names, later developed versions or products under different trademark names may be used.

The I/O unit in each of laptops 12(1), 12(2) and 12(3) has one or more ports capable of sending and receiving range-limited signals 13, such as infrared or audio, although contact, removable storage devices and short cables, such as serial cables, may be used, to enable the laptops 12(1), 12(2) and 12(3) to exchange preauthorization data with each other. Moreover, the I/O unit may have one or more ports capable of sending and receiving data to and from a network 14. In this example, the laptops 12(1), 12(2) and 12(3) are each connected to the network 14 at one or more of these ports in its I/O unit to enable the laptop 12(1) to communicate with the network 14. Since devices, such as laptops 12(1), 12(2), and 12(3), are well known in the art, the specific elements, their arrangement within laptops 12(1), 12(2) and 12(3) and operation will not be described in detail here.

Network 14 comprises a wire-based network, such as the Internet, although network 14 may also include other types of networks. Moreover, network 14 enables laptops 12(1), 12(2) and 12(3) to communicate with each other, and any other devices with access to the network 14, such as computers or printers (not illustrated).

In embodiments of the present invention, devices, such as laptops 12(1), 12(2) and 12(3), are provided for exemplary purposes only. These devices may comprise other types of devices or systems that can store, process and execute instructions for performing one or more methods of the present invention as will be described in further detail herein. By way of example only, the devices shown in FIG. 1 may also comprise personal digital assistants, scanners, digital cameras, cellular telephones, video camera recorders, audio input/output devices, copier devices, remote control devices, appliances, and file systems or databases residing in a computer system.

Figure 2:
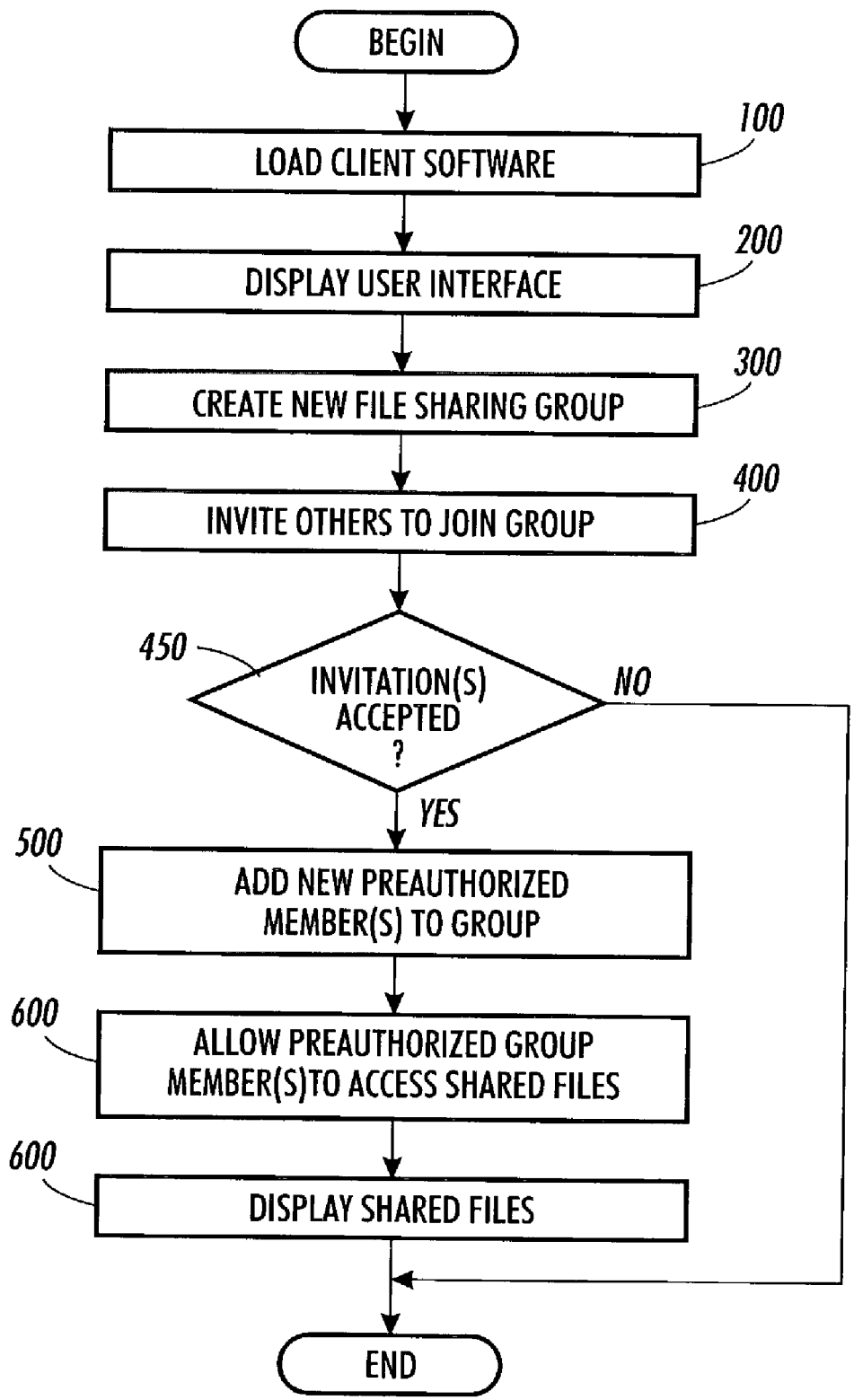
FIG. 2 is a flow chart of a process for sharing files in accordance with embodiments of the present invention.

The operation of the file sharing system 10 in accordance with embodiments of the present invention will now be described with reference to FIGS. 2-10, with like reference numbers identifying identical elements throughout these figures. Referring specifically to FIG. 2 and beginning at step 100, the laptop 12(1) begins operating the client and server software stored in its memory, although the laptops 12(2), 12(3) may operate their respective client and server software as well.

At step 200 and referring to FIGS. 3A-3B, the laptop 12(1) displays a first user interface 13(1), which is generated by the client software operating on laptop 12(1). In embodiments of the present invention, using a common user interface, such as the Web browser first user interface 13(1), does not require users to use unfamiliar user interfaces while enabling the users to enjoy the benefits of the present invention as described herein. By way of example only, a user at laptop 12(1) desires creating a new file sharing group for sharing files with other users in the system 10. Thus, the laptop 12(1) user manipulates an input device, such as a mouse, to select a "Start a Group.html" icon 20 by clicking on the icon 20 to initiate the process.

The laptop 12(1) is configured to respond to the icon 20 selection by opening a file linked to the icon 20 and displaying the file contents (not illustrated), which may provide additional user interface elements and user instructions on how to create a new file sharing group. Further, the user may be prompted to input a name to use for referring to the new file sharing group, such as "conference-buddies." Additionally, the client software updates the first user interface 13(1) shown in FIG. 3A, and displays the updated first user interface 13(2) shown in FIG. 3B, which shows the files being shared by the group created above at step 200. By way of example only, at this point in the process no files have been associated with the newly created group. Further, a user at the laptop 12(1) may desire associating one or more of its files with the newly created file sharing group to provide other group members with access to those files.

Figure 4:
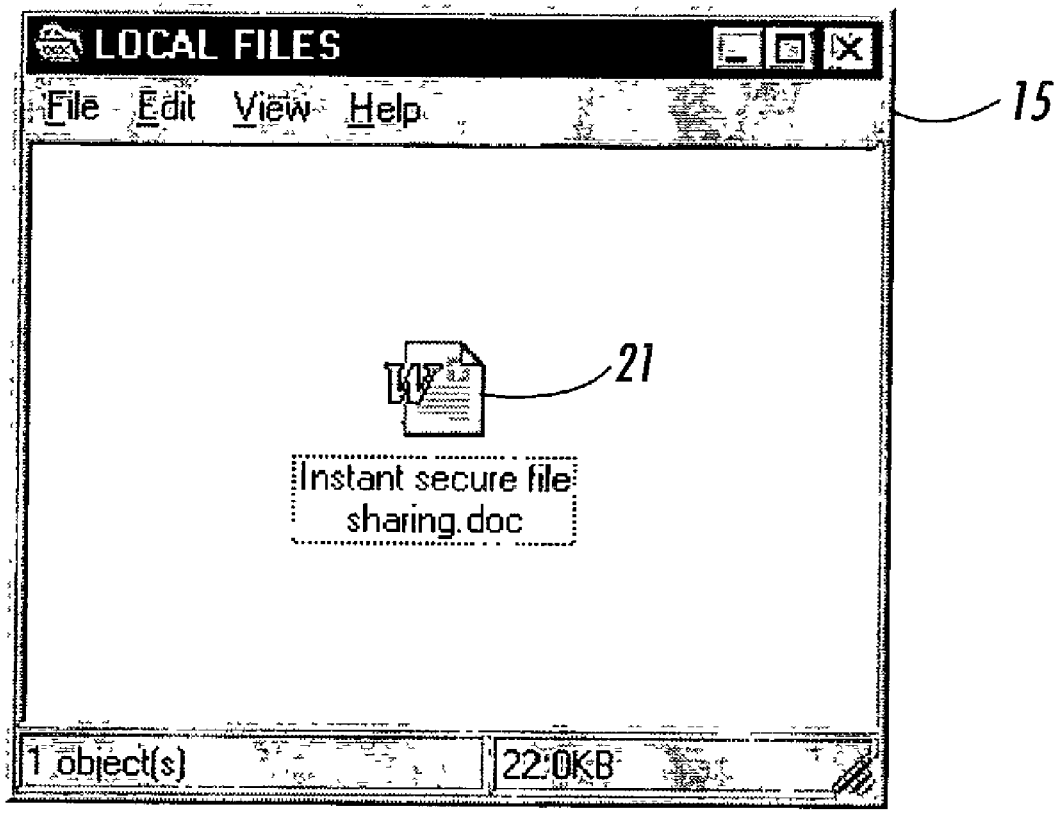
FIG. 4 is an exemplary user interface showing a local file listing of a device in the system shown in FIG. 1.

At step 300 and referring to FIG. 4, the laptop 12(1) user optionally makes a local file linked to the "Instant secure file sharing.doc" icon 22 accessible to the group, which at this point includes laptop 12(1), by dragging the icon 22 from a local file window 15 and dropping the icon 22 into the interface 13(2) shown in FIG. 3B. In response, the client software creates a copy of the icon 22, which is displayed in the updated first user interface 13(2). Further, the client software communicates with the server software to provide it with information describing the file linked to the icon 22, such as the file metadata and location in the laptop 12(1) memory. Also, the laptop 12(1) generates and stores in its memory a group member list 30 shown in FIG. 5.

The group list 30 includes a public key that the group members, such as laptop 12(1), use to authentic themselves to other group members, described further herein at step 600. A private key corresponding to the public key for laptop 12(1) is included in the group member list 30 stored in a protected area of the laptop 12(1) memory. Further, the laptop 12(1) stores a sequence number in the group list 30, which will be described in further detail herein. The laptop 12(1) provides the information included in the group list 30 to members it encounters and/or adds to the group, such as laptop 12(2), who will then maintain its own group list based, at least initially, on the information from list 30 as received from laptop 12(1). In embodiments of the present invention, the group member lists, such as the group member list 30, are maintained on each machine which joins the file sharing group as a look-up table or relational database with key-value pairs. In this example, the keys are identifiers for the machines or group members, such as laptops 12(1), 12(2), and each value represents an attribute that each member will store with respect to each machine or member of the group, such as the sequence number and the public key. In embodiments of the present invention, security protocols need not be used to secure communication between the server and client software residing on the same machine, such as laptops 12(1), 12(2) and 12(3), although additional security protocols can be implemented if desired.

At step 400, by way of example only, a user at the laptop 12(1) desires adding one or more new members to the file sharing group created above at steps 200-300. Thus, the user may select an "Invite other to join this group.html" icon 24, shown in FIG. 4, which may cause the client software to display the contents of the file linked to the icon 24 to provide additional user interface elements and user instructions on how to invite a new member to the file sharing group.

Figure 5:
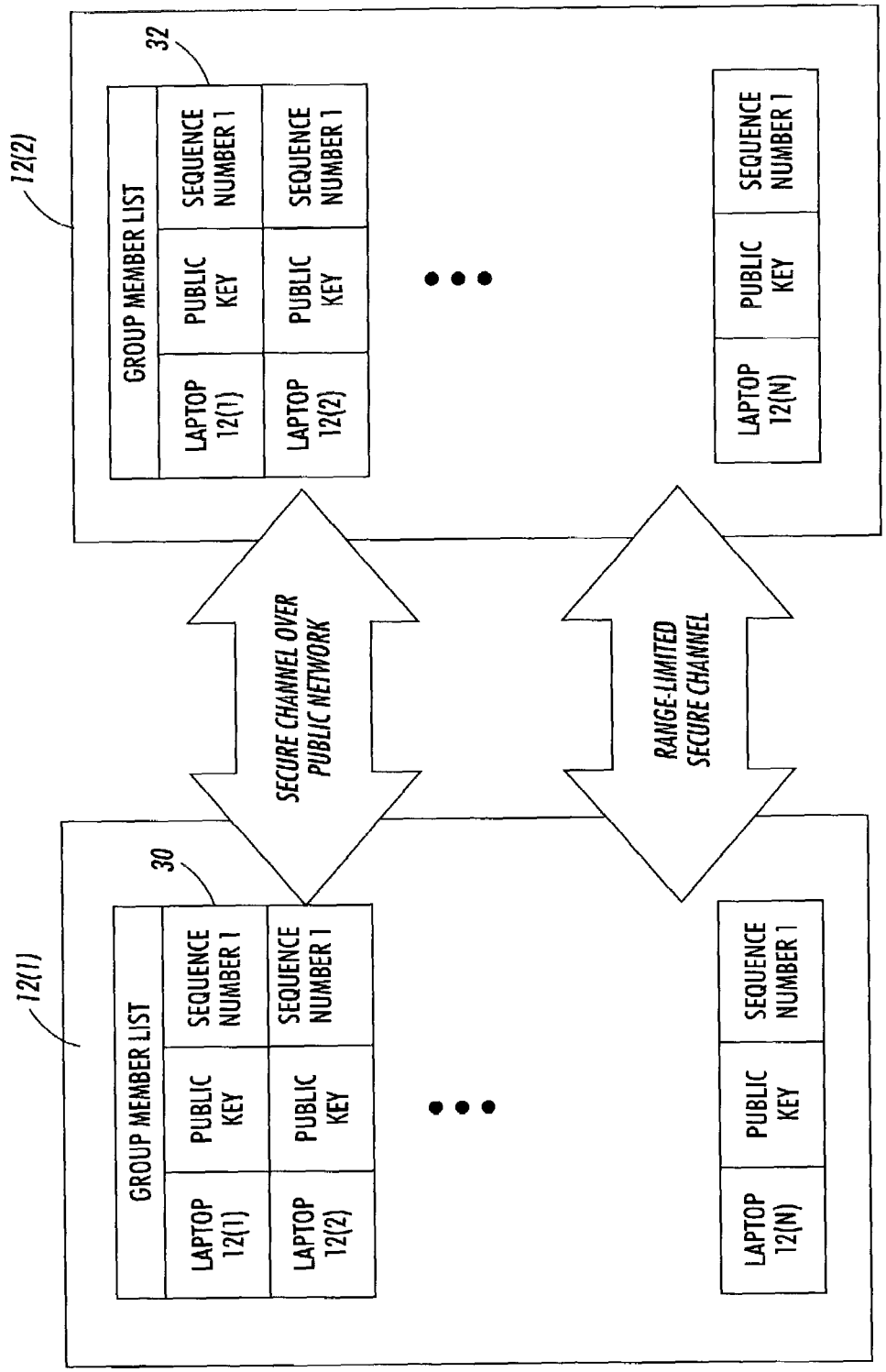
FIG. 5 is a functional block diagram of a portion of the system shown in FIG. 1.

Referring to FIG. 5, the icon 24 selection may also cause the laptop 12(1) to invite one or more devices, such as laptop 12(2), to join the group using the one or more ports in its I/O unit that are capable of sending and receiving range-limited signals 13. In embodiments of the present invention, laptops 12(1), 12(2) are configured to send/receive the appropriate signals 13 to/from each other with respect to acceptances or rejections to invitations for joining file sharing groups. Moreover, the laptops 12(1), 12(2) are configured to understand these signals 13 and respond appropriately, as described herein in accordance with embodiments of the present invention.

In this example, the laptops 12(1), 12(2) are located physically nearby each other. This ensures that any eavesdroppers would be easily identified, since they would need to be physically nearby the laptops 12(1), 12(2) to be able to intercept their communications. The laptops 12(1), 12(2) are close enough to each to be able to communicate using the range-limited signals 13, the distance depending on the range capabilities of the respective I/O units in each of laptops 12(1), 12(2).

Figure 6:
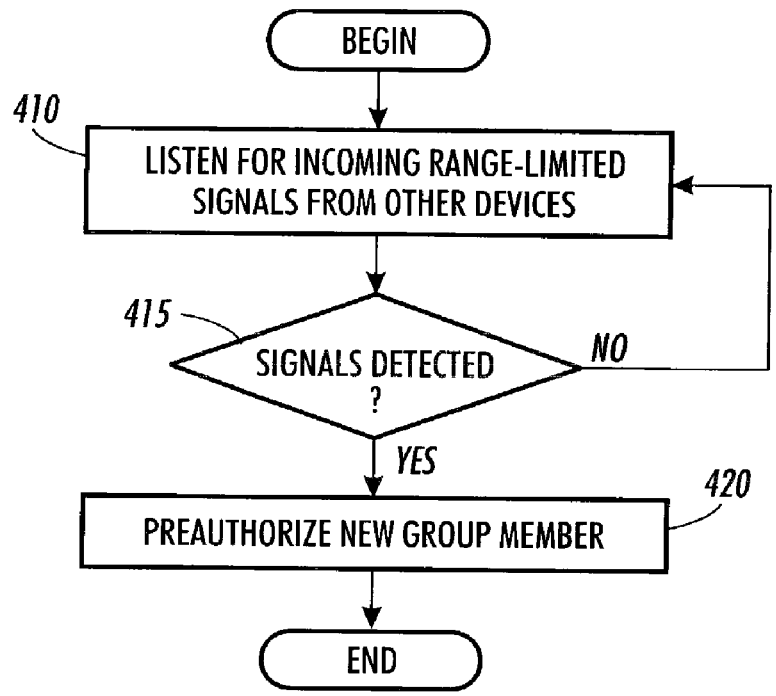
FIG. 6 is a flow chart of a process for sharing files in accordance with embodiments of the present invention.

Referring to FIG. 6, at step 410, the laptop 12(1) is configured to open the one or more ports in its I/O unit to listen for incoming range-limited signals.

At decision box 415, if the laptop 12(1) does not detect incoming signals the NO branch is followed and step 410 is repeated until a set period of time has elapsed, such as thirty seconds for example, although step 410 may be repeated until user input is detected by the laptop 12(1), such as mouse movement or a particular combination of keys is pressed, or until incoming signals are detected. But if incoming signals are detected at decision box 415, then the YES branch is followed. By way of example only, the laptop 12(1) detects incoming signals sent from the laptop 12(2), and thus the YES branch is followed.

At step 420, the laptop 12(1) preauthorizes the laptop 12(2) for further communications on the network 14, as will be described further herein, using one or more of the preauthorization methods disclosed in co-pending U.S. patent application Ser. No. 10/066,699 to Balfanz et al., titled "APPARATUS AND METHODS FOR PROVIDING SECURED COMMUNICATION," filed Feb. 6, 2002, which is hereby incorporated by reference in its entirety. In particular, the laptop 12(1) and the laptop 12(2) communicate using the range-limited signals described above at step 410 to exchange trust information, such as a key commitment to a public key, although other credentialing mechanisms may be used. The key commitment provides a level of trust for this preauthorization process. Further, the laptops 12(1) and 12(2) exchange location information, such as a location on the network 14 and/or port information. The public key commitment and the location information received from the laptop 12(2) is stored in a temporary memory buffer in laptop 12(1) for further processing as described further herein in connection with step

500. Further, laptop 12(2) also stores the public key commitment and the location information received from the laptop 12(1) in a temporary memory for further processing as described herein. Users of laptops 12(1), 12(2) are oblivious to this exchange, thus unburdening users from having to explicitly provide the trust information.

Referring back to FIG. 2, at decision box 450, if step 410 is repeated until one or more of the conditions described above in connection with decision box 415 are met, then laptop 12(1) concludes that no other machines have accepted its invitation to join the new file sharing group and the NO branch is followed where the process ends, although steps 400-450 may be repeated until at least one machine accepts the invitation. But in this example, as mentioned above, the laptop 12(2) accepts the laptop 12(1)'s invitation to join the group and thus the YES branch is followed.

At step 500, the laptop 12(1) adds the preauthorized laptop 12(2) to the new file sharing group as described further herein below in connection with steps 510-520.

Figure 7:
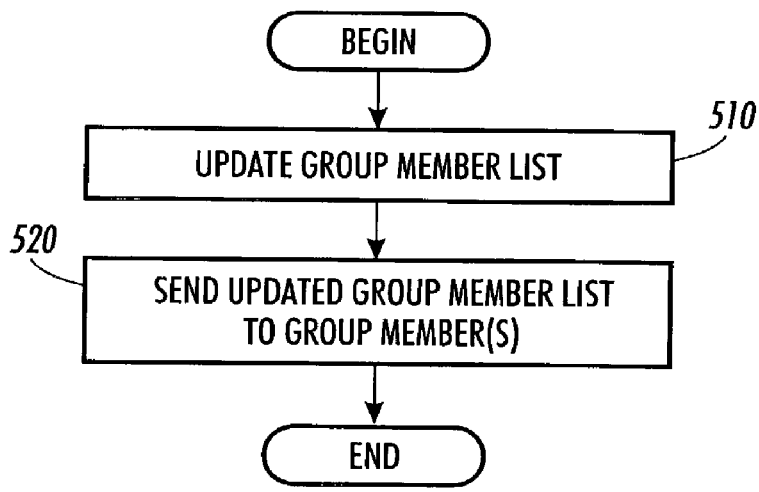
FIG. 7 is a flow chart of another process for sharing files in accordance with embodiments of the present invention.

Referring to FIG. 7, at step 510, the laptops 12(1) and 12(2) find and contact each other via the network 14 using the location information exchanged above. The laptops 12(1) and 12(2) request each other's public keys, which they committed to using the range-limited signals 13, along with other credentialing information, such as certificates. The public keys and other credentialing information are exchanged, and the thus the laptops 12(1) and 12(2) can now communicate securely over the unsecure network 14 to thereby establish a secure channel over the network 14. The laptop 12(1) updates the group member list 30, shown in FIG. 5, by retrieving the laptop 12(2) public key, sent to the laptop 12(1) at step 420, from its temporary memory, and adding it to the group member list 30 stored in the laptop 12(1) memory, although the laptop 12(1) does not need to add the laptop 12(1) key to the list 30 as described herein below at step 520. Moreover, the laptop 12(2) associates a sequence number with the membership information for laptop 12(2) and adds it to the group member list 30.

In embodiments of the present invention, the sequence number changes as the group membership changes. In particular, each machine in the group, such as laptop 12(1), which maintains a group member list and associates a sequence number with each member in the group that it has a record of in its group member list. In embodiments of the present invention, this counter may initially be set to "1," and is incremented each time a member is added to or deleted from the group. Moreover, one or more machines in the system 10, such as laptop 12(1), may be configured to recognize that an odd value for the sequence number entry in the group member list 30 represents that the associated group member, such as laptop 12(1), is a current member of the group. An even value for the sequence number would then represent that the associated group member is no longer a current member of the group. Of course, the relationship between the numbers and their meanings within the system 10 is arbitrary so long as each of the machines in the system 10 are configured in the same manner.

In this example, the laptop 12(1) associated a sequence number "1" with the laptop 12(1) key in the group member list 30 when it created the list, and also associated a sequence number "1" with the laptop 12(2) key in the group member list 30.

At step 520, the laptop 12(1) sends, using the range-limited signals 13, the updated member list 30 to other group members that are within range of the signals 13, which in this example at this point includes laptop 12(2), although the updated list 30 may be sent over the network 14. Further, the laptop 12(2) adds its public key, if not already present as described above at step 510, to the second member list 32. The laptop 12(2) stores the member list 32 in its protected memory. Further, the laptop 12(2) adds a sequence number to its group list 32. In this example, the laptop 12(2) assigns the value "1" to the laptop 12(2) entry in its group list 32.

Figure 8:
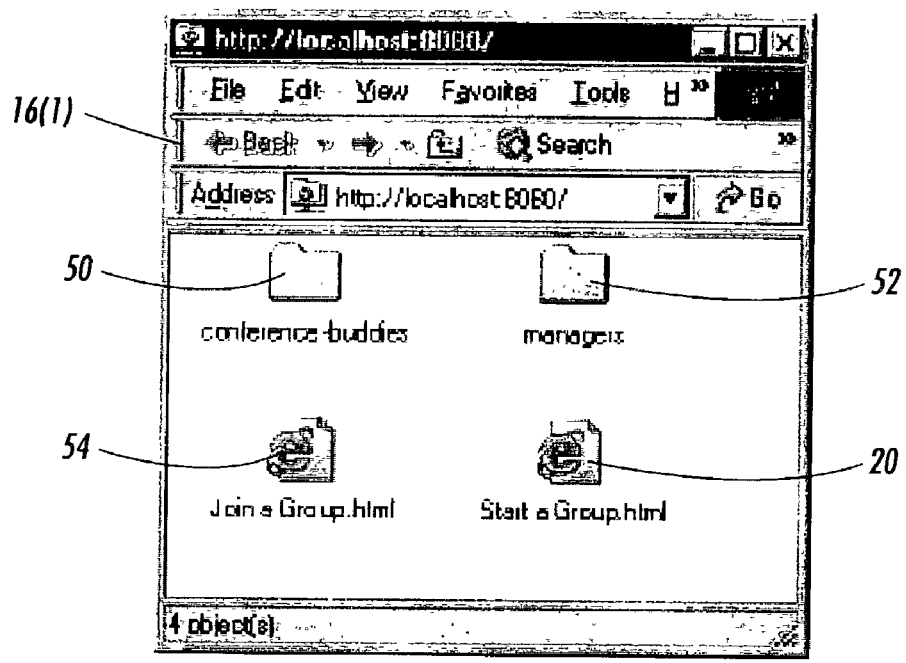
FIG. 8 is an exemplary user interface used in the system shown in FIG. 1.

Referring back to FIG. 2, at step 600, the laptop 12(2) operates its client software and displays a second user interface 16(1) shown in FIG. 8. In this example, the second interface 16 shows a "conference-buddies" folder icon 50 that represents the newly created file sharing group, which includes laptops 12(1), 12(2) as mentioned above. By way of example only, the laptop 12(2) user desires accessing one or more files in the "conference-buddies" group, and thus selects the folder icon 50.

Figure 9:
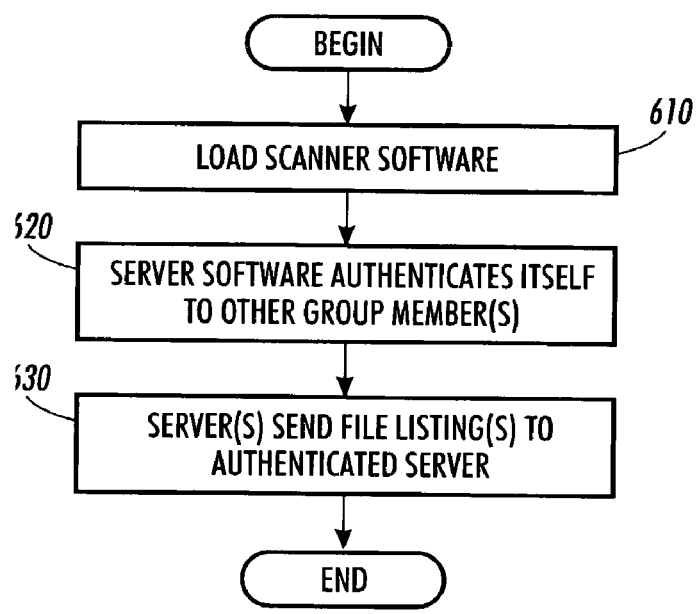
FIG. 9 is a flow chart of another process for sharing files in accordance with embodiments of the present invention.
Figure 10:
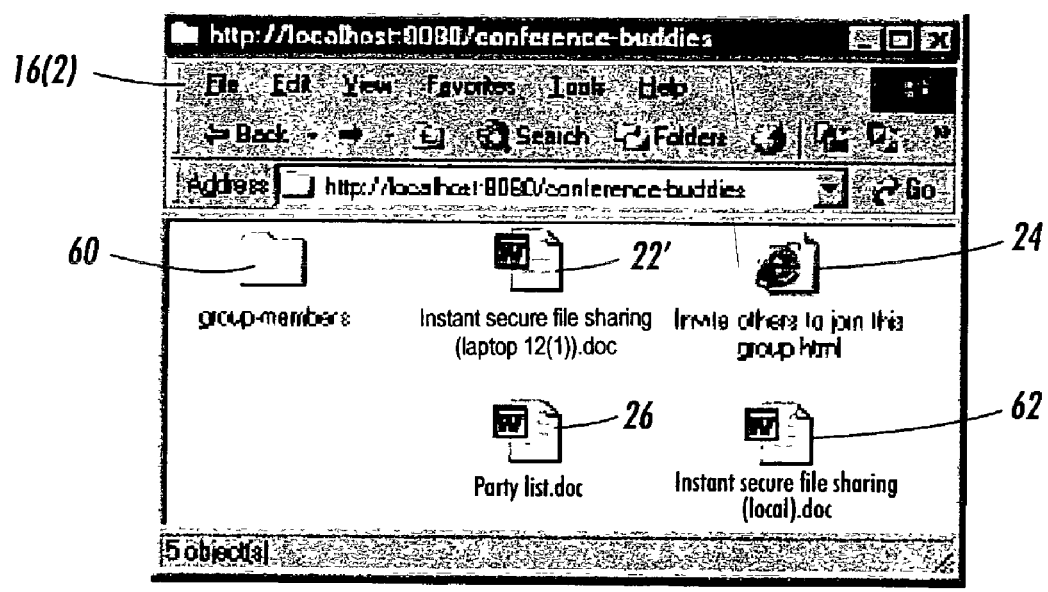
FIG. 10 is an exemplary user interface used in the system shown in FIG. 1.

Referring to FIGS. 9-10, at step 610, the laptop 12(2) is configured to respond to the folder icon 50 selection by operating its server software and proceeding to step 620.

At step 620, the laptop 12(2) server software communicates with the laptop 12(1) server software over the secure channel established over network 14 described above. In embodiments of the present invention, this communication takes place over the network 14 rather than by using the range-limited signals 13 since data transfer rates will usually be greater on the network 14, although these communications may use the range-limited signals 13. Moreover, the devices in the file sharing group, such as laptops 12(1), 12(2), may move to locations that are out of range for the range-limited communications to take place, and thus using the network 14 may be desirable or necessary. Thus, the laptop 12(2) server software authenticates itself to the server software of the other file sharing group members' machines, which in this case includes laptop 12(1).

In particular, the laptop 12(2) sends its public key to the laptop 12(1). The laptop 12(1) inspects the member list 30 to determine whether the laptop 12(2) is a member of the group. This includes the laptop 12(1) checking the list 30 to determine whether the laptop 12(2) is even included in the list, comparing the public key sent from the laptop 12(2) with the public key stored in the list 30 to determine if they are the same, and examining the sequence numbers stored in the lists 30, 32. If the laptop 12(1) determines that the public key sent from the laptop 12(2) does not match the public key associated with the laptop 12(2) in the member list 30, then it concludes that the laptop 12(2) is not a member of the group and will refuse to provide the laptop 12(2) with further information. But if the laptop 12(1) determines that the public key sent from the laptop 12(2) matches the public key included in the member list 30 that is associated with the laptop 12(2) key, then it concludes that the laptop 12(2) is, or at least at some point was, a current member of the group.

Further, the laptop 12(1) in this example inspects the member list 30 to determine whether the sequence number for the laptop 12(2) indicates that the laptop 12(2) is a current member of the list. If the sequence number for laptop 12(2) stored in the list 30 is different than the sequence number received from the laptop 12(2), and included in the second list 32, then the laptop 12(1) will further analyze the sequence number. In particular, the laptop 12(1) determines whether the value of the sequence number received from the laptop 12(2) is odd or even. Moreover, the laptop 12(1) determines whether the sequence number value for the laptop 12(2) as stored in the list 30 is greater or less than the value received from the laptop 12(2).

If the laptop 12(1) determines that the sequence number value stored in the list 30 is greater than the sequence number value received from the laptop 12(2), the sequence number value stored in the list 30 will be determinative of whether the laptop 12(2) is a current member. But if the sequence number stored in the list 30 is less than the sequence number received from the laptop 12(2), then the sequence number value from the laptop 12(2) will be determinative. In any case, as mentioned above, an odd sequence number value indicates that the machine is a current member, and an even value indicates the machine is not a current member.

Thus in this example, the sequence number of "1" included in the list 30 for the laptop 12(2) indicates that the laptop 12(2) is a current member of the file sharing group, at least as far as the laptop 12(1) is concerned. Further in this example, since the laptop 12(1) receives a sequence value of "1" from the laptop 12(2), and neither of the values are greater or less than each other since they are equal in this case, the laptop 12(1) concludes that the laptop 12(2) is a current member of the group. Moreover, the laptop 12(1) also determines in this example that the public key for the laptop 12(2) as stored in the list 30 is the same as the public key received from the laptop 12(2), as discussed above, and the process continues to step 630.

At step 630, the server software operating on the laptop 12(1) sends the laptop 12(2) server software a listing of the local files the laptop 12(1) associated with the "conference-buddies" file sharing group at step 300, although the server will not send a file listing if the laptop 12(1) has not associated any of its local files with the group. Further, the file listing and any other information sent from the laptop 12(1) is encrypted using the public key for the laptop 12(2) as stored in the list 30.

Referring back to FIG. 2, at step 700, the server software operating on the laptop 12(2) receives the encrypted file listing information from the laptop 12(1) server software, decrypts the information using its private key corresponding to the public key used to encrypt the files, and provides the file listing to the client software operating on the laptop 12(2). As described above in connection with FIG. 3B, the laptop 12(1) user optionally makes a local file linked to the "Instant secure file sharing.doc" icon 22 accessible to the group, which is displayed in the updated first user interface 13(2).

Further, by way of example only, the laptop 12(2) user can optionally add one or more laptop 12(2) local files to the file sharing group in the same manner described above with respect to laptop 12(1) adding a file to the group at step 300. In this example, however, the laptop 12(2) may have a local file that the user desires adding which has the same file name as one of the files provided by one or more other group members, such as the laptop 12(1). The laptop 12(2) is configured to detect such file name collisions and thus modifies the name of the conflicting file as it appears to the user of the laptop 12(2), without renaming the actual file.

For example, both the laptop 12(1) and the laptop 12(2) may both have a file named "Instant secure file sharing.doc." A user at the laptop 12(2) may add a local file, such as a file named "Instant secure file sharing.doc," to the file sharing group in the same manner described above in connection with the laptop 12(1) adding a local file to the group. In this example, the laptop 12(2) determines that there is a file name collision between the laptop 12(2) local file named "Instant secure file sharing.doc" and the file already present in the file sharing group named "Instant secure file sharing.doc," which in this example actually resides at the laptop 12(1). The laptop 12(2) is configured to prompt the user, using a graphical user interface, for instance, to warn the user that there is a file name conflict. Moreover, the laptop 12(2) may ask the user whether they intend to add the conflicting file (e.g., "Instant secure file sharing.doc") to the group or to overwrite the identically named file already present in the group.

If the user indicates, using an input device, that they would like to overwrite the existing file, then the laptop 12(2) adds the file and overwrites the identically named file already present in the file sharing group. But if the user indicates that they do not intend on overwriting the file, then the laptop 12(2) is configured to modify the manner in which both conflicting files are representing by changing their file names as they are displayed, and not actually changing their filenames in memory, as shown in FIG. 10. Thus, the laptop 12(2) generates an updated second user interface 16(2), which shows an "Instant secure file sharing (laptop 12(1)).doc" file icon 22' linked to the file added to the group by laptop 12(1) at step 300, and an "Instant secure file sharing (local).doc" file icon 62 linked to the local file being added to the group by the laptop 12(2).

The new file name would be communicated by the server software operating on the laptop 12(2) to the other group members, such as the laptop 12(1), which then also displays the same renamed icons to indicate the local version of the file and the file residing at another machine in the group. The laptop 12(2) optionally re-authenticates itself to the laptop 12(1) server software by performing the same process as laptop 12(1) described above in connection with steps 620 and 630. Further in this example, the user at the laptop 12(2) may decide adding another local file to the group, such as a file named "party list.doc." In this case, there is no filename conflict. Thus a "party list.doc" file is added to the group by the laptop 12(2), and a "party list.doc" icon 26 linked to the file added by the laptop 12(2) is displayed, although a greater or lesser number of files may be displayed in the interface 16(2). Thus, the server software operating on the laptop 12(2) is configured to send the updated file list to the other group members, laptop 12(1) in this example. Again, the laptop 12(2) optionally re-authenticates itself to the laptop 12(1) server software by performing the same process as laptop 12(1) described above in connection with steps 620 and 630. Thus, the user interface displayed by the laptop 12(1) would be updated to reflect the new file added by the laptop 12(2).

By way of example only, a laptop 12(2) user may desire viewing the contents of a file in the group linked to one or more icons 22', 24. In this example, the laptop 12(2) user may select the "Instant secure file sharing (laptop 12(1)).doc" file icon 22', and the laptop 12(2) client software communicates the icon 22' selection to the laptop 12(2) server software, although the user may select the icon 26. The laptop 12(2) server software re-authenticates itself to the laptop 12(1) server software by repeating steps 620 and 630, and if the laptop 12(2) is still a valid member of the file sharing group, which in this example it is, the laptop 12(1) server software sends the file linked to icon 22 to the laptop 12(2) server software over the network 14, although the re-authentication steps are not necessary where increased system performance is desired. In turn, the laptop 12(2) server software sends the file to the laptop 12(2) client software, which may then display the file to the laptop 12(2) user (not illustrated), although the client software may launch a user interface appropriate for the type of file, such as an MS Word™ plug-in viewer, to display the file.

By way of example only, in this embodiment the laptop 12(2) user may desire knowing who the members of the file sharing group are. Thus, the user may select the "group members" icon 60 displayed in the user interface window 16(2) using an input device (e.g., mouse, keyboard). In response, the server software operating on the laptop 12(2) may obtain the list of group members from the second list 32, shown in FIG. 5, and display a list of group members on another user interface window (not illustrated), for example.

An alternative embodiment of the file sharing system 10 will now be described with reference to FIG. 11 and referring back to FIGS. 2-10, with like reference numbers identifying identical elements. By way of example only, the laptop 12(2) user may desire adding another member, such as the laptop 12(3), to the file sharing group. Thus, steps 400-700 are performed as described above, except laptop 12(2) performs the functions described above with respect to laptop 12(1), and laptop 12(3) performs the functions described above with respect to laptop 12(2). Thus, at step 400 a user at the laptop 12(2) desires adding one or more new members to the file sharing group created above at steps 200-300. Referring to FIG. 5, the laptop 12(2) invites one or more devices, such as laptop 12(3), to join the group using the one or more ports in its I/O unit that are capable of sending and receiving range-limited signals.

In embodiments of the present invention, laptop 12(3) is also configured to send/receive the appropriate signals to/from each other with respect to acceptances or rejections to invitations for joining file sharing groups. Moreover, the laptop 12(3) is also configured to understand these signals and respond appropriately, as described herein in accordance with embodiments of the present invention. In this example, the laptops 12(1), 12(2) and 12(3) are located physically nearby each other.

Figure 11:
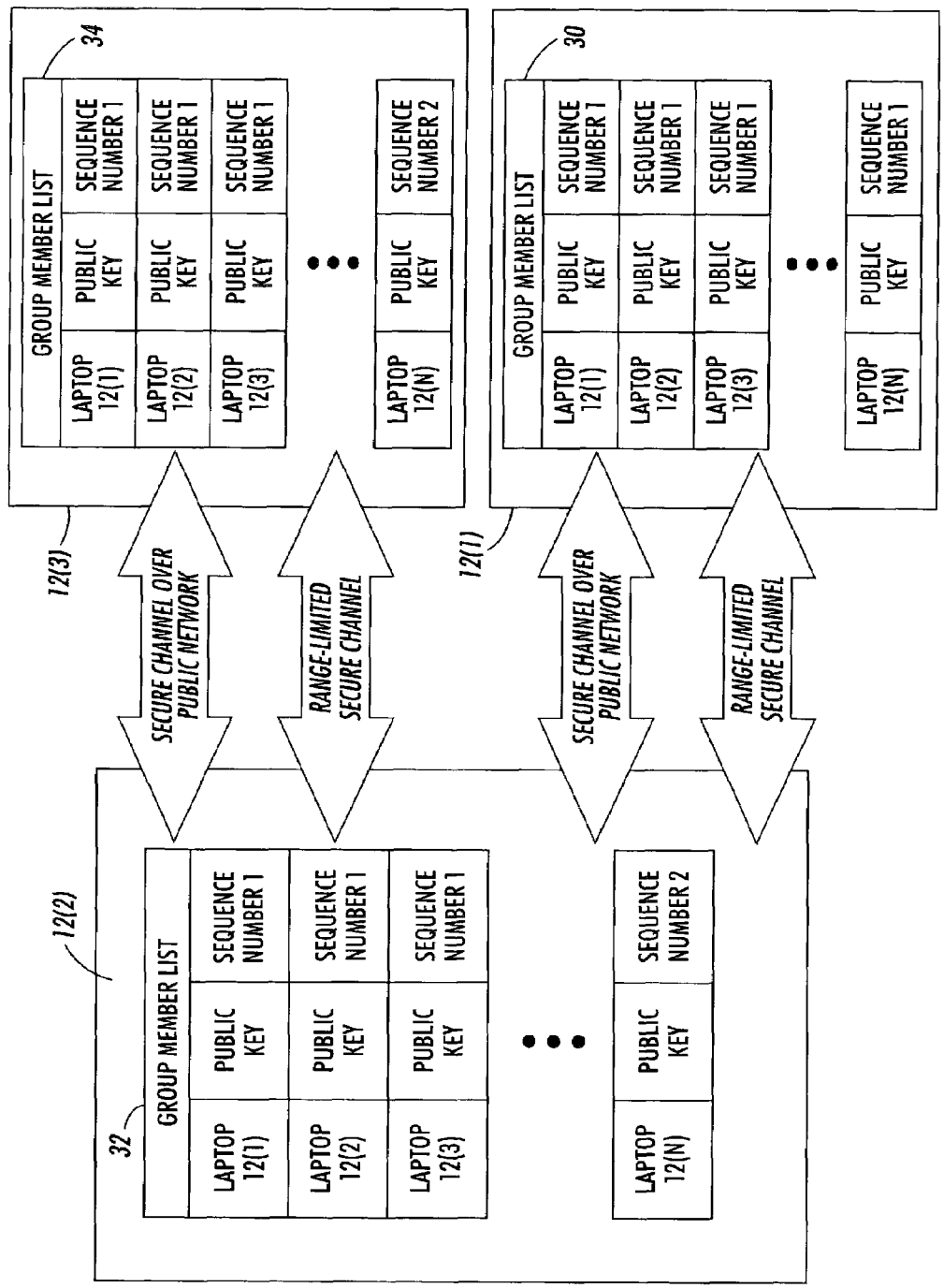
FIG. 11 is a functional block diagram of a system for sharing files accordance with embodiments of the present invention.

At step 510, the laptop 12(2) updates its group member list 32, as shown in FIG. 11, by retrieving the laptop 12(3) public key, sent to the laptop 12(2) at step 420, from its temporary memory and adding it the group member list 32 stored in the laptop 12(2) memory. Moreover, the laptop 12(2) associates a sequence number with the membership information for laptop 12(3) and adds it to the second group member list 32.

At step 520, the laptop 12(2) sends the updated group member list 32 to the other group members, such as laptops 12(1), 12(3). The laptop 12(3) in turn stores the information in its memory as the third group member list 34. When laptop 12(2) sends the updated group member list 32 information to the laptop 12(1), the laptop 12(1) examines the information, such as the sequence number for each group member. The sequence number stored in the first group member list 30 for the laptop 12(1) is "1" and the sequence number stored in the second updated group member list 32 for the laptop 12(1) is "1," and thus the values are both odd indicating that the laptop 12(1) is still a current member of the group.

Moreover, the laptop 12(1) examines the value of the sequence number associated with the updated list 32 for each machine included in the list, and determines that the sequence number associated with a laptop 12(n) is different than the sequence number stored in at the first group member list 30 for the same machine (i.e., laptop 12(n)). Further, the laptop 12(1) determines that the sequence number for the laptop 12(n) in the second updated group member list 32 is "2," which is higher than the sequence number included in the list 30, and further is an even number.

Accordingly, the laptop 12(1) determines that the laptop 12(n) has been deleted from the file sharing group at some point. Further, since the sequence number included in the list 32 is higher than the sequence number included in the first group member list 30, the laptop 12(1) will update its group member list 30, and in particular the sequence number for the laptop 12(n), to indicate the updated sequence number "2" (not illustrated). Thus, as the laptop 12(n) may have been deleted at some point when the laptop 12(1) was not available to receive an updated member list from other group members, using a sequence number as described herein helps the group members, such as the laptop 12(1) synchronize with other members to keep group membership lists updated. The use of sequence numbers is deterministic and fast, and helps ensure consistent group membership lists. Further, new credentials do not have to be reissued for the entire group and system clocks do not have to be synchronized between group members. So, further, a custom protocol does not need to be written in order to synchronize the group membership lists.

At step 620, the laptop 12(3) server software server software authenticates itself to the server software of the other file sharing group members' machines, which in this case also includes laptops 12(1), 12(2). The laptop 12(3) sends its public key to the laptops 12(1), 12(2), each of which inspects its locally stored updated member list to determine whether the laptop 12(3) is a member of the group. If one or more of the laptops 12(1), 12(2) determine that the public key sent from the laptop 12(3) does not match the public key associated with the laptop 12(3) in their respective copy of the member list, then it concludes that the laptop 12(3) is not a member of the group and will refuse to provide the laptop 12(3) with further information. But if one or more of the laptops 12(1), 12(2) determine that the public key sent from the laptop 12(3) matches the public key included in the member list that is associated with the laptop 12(3), then it concludes that the laptop 12(3) is a valid member of the group, and the process continues to step 630.

At step 630, the server software operating on the laptops 12(1), 12(2) sends the laptop 12(3) server software a listing of the local files the laptops 12(1), 12(2) associated with the "conference-buddies" file sharing group.

Referring back to FIG. 2, at step 700, the server software operating on the laptop 12(3) provides the file listing to the client software operating on the laptop 12(3). Further, by way of example only, the laptop 12(3) user optionally adds one or more laptop 12(3) local files to the file sharing group in the same manner described above with respect to the laptops 12(1), 12(2) optionally adding a file to the group. The laptop 12(3) client software generates an updated user interface showing any files associated with the group (not illustrated), and a laptop 12(3) user may select and view one or more files.

In still another embodiment of the present invention, one or more group members, such as laptops 12(1), 12(2) and 12(3), may desire starting another file sharing group. Thus, the same steps described above in accordance with embodiments of the present invention are performed to create another file sharing group. Further, as described above, the user may be prompted to input a name to use for referring to the new file sharing group, such as "managers." The group members and files associated with this new group are separate from the "conference-buddies" group established above initially. Thus, a member of one group, such as the "conference-buddies" group, would not necessarily be aware that the other group, such as the "managers" group, existed, unless they joined that group as well. Once the new group is created, a user window may be displayed that includes a "managers" icon 50, as shown in FIG. 8.

In yet another embodiment of the present invention, one or more group members, such as laptops 12(1), 12(2) and 12(3), may desire dissociating or deleting one or more member devices from the file sharing group. Thus, a "delete group member" icon (not illustrated) may be provided. The deleting device then modifies the sequence number in the group member list so that the corresponding sequence number value of the device being deleted from the group is incremented to become an even number, which in this example indicates a deleted group member. The deleting device then sends an updated group member list to the other group members that are available. Further, users at one or more group members, such as laptops 12(1), 12(2) and 12(3), may desire deleting files from the file sharing group. The system 10 may be configured to determine whether group members are allowed to perform such deletion functions. In embodiments where group member devices are authorized to delete files stored on other machines, a user may select a particular icon representing a file desired to be deleted, and the deleting device's server software would communicate this request to the server software operating on the device storing the file desired to be deleted. Once the file(s) is deleted, the device that stored the deleted file would send out an updated file listing to the other group members that are available.

In another embodiment of the present invention, a user at a device, such as laptop 12(3), that is not a member of a group, or is a member of a group but desires joining another group, selects a "join a Group.html" icon 54 displayed in a user interface window 16(1) shown in FIG. 8. In response, the laptop 12(3) opens one or more ports in its I/O unit that are capable of sending and receiving range-limited signals 13. The laptop 12(3) in this embodiment listens for any invitations to join groups as described above, and is further configured to send the appropriate signals 13 to another machine which sends an invitation, such as laptop 12(1), to accept or reject an invitation to join a file sharing group. Thereafter, laptop 12(3) is added to the file sharing group as described above in accordance with embodiments of the present invention.

One or more embodiments of the present invention provide a file sharing method and system 10 that makes it simple and easy for users to securely share files amongst each other. File sharing groups are formed among system 10 users by physically pointing each user's respective device, such as laptops 12(1), 12(2) and 12(3), towards each other to exchange security protocol information, such as keying information, over secure range-limited channels. These security mechanisms work implicitly and under the hood of what users see, and are difficult for eavesdroppers to listen in on undetected. Users in the system 10 operate a lightweight, personal file server on their respective laptops 12(1), 12(2) and 12(3), and are able to easily communicate securely over an unsecure network 14 to share files securely. As far as the system 10 users are concerned, they are just forming ad-hoc file sharing groups, which are secure, even though central servers, public key infrastructures, or certification authorities need not be involved. This system 10 does not require a great deal of user effort to setup and share the files with carefully identified users, and eliminates complex configuration and registration steps inherent to current practices.

While particular embodiments have been described above, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified in the claims.

What is claimed is:

1. A method comprising:
   preauthorizing a first device to communicate with at least one of a second device and a plurality of other devices by exchanging credentialing information via a secure network; and
   accessing at the first device at least one file accessible to the first device through a first file system, access to the at least one file is provided to the first file system via a secure channel over an unsecure network by at least one of the second device and the other devices upon the first file system authenticating itself using the credentialing information to a second file system on the second device or the other devices which store the at least one file being accessed,
   wherein the first device provides a list of devices it has received or provided preauthorization information to over the secure network to at least one of the second device and the other devices, at least one of the second device and the other devices that receive the list providing the list to at least one of the second device and the other devices that do not receive the list, and the list is associated with a list sequence number and each member on the list is associated with a member sequence number that is incremented as a member is added or deleted from the list, the list sequence number and each member sequence number used by at least one of the first device, the second device and the other devices to keep another list of member devices stored at the first device, the second device or the other devices substantially current.

2. The method as set forth in claim 1 wherein preauthorizing further comprises receiving the credentialing information encoded in a range limited signal at the first device from at least one of the second device and the other devices.

3. The method as set forth in claim 2 wherein the credentialing information comprises a commitment to a public key.

4. The method as set forth in claim 1 wherein preauthorizing further comprises sending a first set of the credentialing information from the second device to at least one of the first device and the other devices, the at least one of the first device and the other devices that receive the first set of credentialing information which match a corresponding second of credentialing information stored at the receiving device permitting the second device to access another file stored at the device receiving the first set of credentialing information.

5. The method as set forth in claim 1 further comprising receiving at the first device information describing the at least one file accessible to the first device from at least one of the second device and the other devices which store at least one accessible file.

6. The method as set forth in claim 1 further comprising providing a user interface at the first device for enabling a user to access the at least one file, for enabling the user to associate at least one first device local file with the first file system to provide at least one of the second device and the other devices with access to the at least one first device local file, for disassociating at least one of the first device, the second device and the other devices from the first file system, for associating a third device with the first file system.

7. The method as set forth in claim 1 wherein the at least one file comprises a first file stored on at least one of the first device, the second device and one of the other devices, and the at least one file further comprises a second file stored on at least one of the first device, the second device and the one other device that does not store the first file, the first file and the second file having an identical file name, the first device renaming at least one of the first file and the second file to resolve a file name conflict.

8. A computer-readable medium having stored thereon instructions, which when executed by at least one processor, causes the at least one processor to perform:

preauthorizing a first device to communicate with at least one of a second device and a plurality of other devices by exchanging credentialing information via a secure network; and accessing at the first device at least one file accessible to the first device through a first file system, access to the at least one file is provided to the first file system via a secure channel over an unsecure network by at least one of the second device and the other devices upon the first file system authenticating itself using the credentialing information to a second file system on the second device or the other devices which store the at least one file being accessed, wherein the first device provides a list of devices it has received or provided preauthorization information to over the secure network to at least one of the second device and the other devices, at least one of the second device and the other devices that receive the list providing the list to at least one of the second device and the other devices that do not receive the list, and the list is associated with a list sequence number and each member on the list is associated with a member sequence number that is incremented as a member is added or deleted from the list, the list sequence number and each member sequence number used by at least one of the first device, the second device and the other devices to keep another list of member devices stored at the first device, the second device or the other devices substantially current.

9. The medium as set forth in claim 8 wherein preauthorizing further comprises receiving the credentialing information encoded in a range limited signal at the first device from at least one of the second device and the other devices.

10. The medium as set forth in claim 9 wherein the credentialing information comprises a commitment to a public key.

11. The medium as set forth in claim 8 wherein preauthorizing further comprises sending a first set of the credentialing information from the second device to at least one of the first device and the other devices, the at least one of the first device and the other devices that receive the first set of credentialing information which match a corresponding second of credentialing information stored at the receiving device permitting the second device to access another file stored at the device receiving the first set of credentialing information.

12. The medium as set forth in claim 8 further comprising receiving at the first device information describing the at least one file accessible to the first device from at least one of the second device and the other devices which store at least one accessible file.

13. The medium as set forth in claim 8 further comprising providing a user interface at the first device for enabling a user to access the at least one file, for enabling the user to associate at least one first device local file with the first file system to provide at least one of the second device and the other devices with access to the at least one first device local file, for disassociating at least one of the first device, the second device and the other devices from the first file system, for associating a third device with the first file system.

14. The medium as set forth in claim 8 wherein the at least one file comprises a first file stored on at least one of the first device, the second device and one of the other devices, and the at least one file further comprises a second file stored on at least one of the first device, the second device and the one other device that does not store the first file, the first file and the second file having an identical file name, the first device renaming at least one of the first file and the second file to resolve a file name conflict.

15. A system comprising:
a preauthorization system that preauthorizes a first device to communicate with at least one of a second device and a plurality of other devices by exchanging credentialing information via a secure network; and an access system that enables the first device to access at least one file accessible to the first device through a first file system, the first file system being provided access to the at least one file by at least one of the second device and the other devices upon the first file system authenticating itself using the credentialing information via a secure channel over an unsecure network to a second file system on the second device or the other devices which store the at least one file being accessed, wherein the first device provides a list of devices it has received or provided preauthorization information to over the secure network to at least one of the second device and the other devices, at least one of the second device and the other devices that receive the list providing the list to at least one of the second device and the other devices that do not receive the list, the list is associated with a list sequence number and each member on the list is associated with a member sequence number that is incremented as a member is added or deleted from the list, the list sequence number and each member sequence number used by at least one of the first device, the second device and the other devices to keep another list of member devices stored at the first device, the second device or the other devices substantially current.

16. The system as set forth in claim 15 wherein the preauthorization system receives the credentialing information encoded in a range limited signal at the first device from at least one of the second device and the other devices.

17. The system as set forth in claim 16 wherein the credentialing information comprises a commitment to a public key.

18. The system as set forth in claim 15 wherein the preauthorization system sends a first set of the credentialing information from the second device to at least one of the first device and the other devices, the at least one of the first device and the other devices that receive the first set of credentialing information which match a corresponding second of credentialing information stored at the receiving device permitting the second device to access another file stored at the device receiving the first set of credentialing information.

19. The system as set forth in claim 15 wherein the access system receives at the first device information describing the at least one file accessible to the first device from at least one of the second device and the other devices which store at least one accessible file.

20. The system as set forth in claim 15 wherein the access system provides a user interface at the first device for enabling a user to access the at least one file, for enabling the user to associate at least one first device local file with the first file system to provide at least one of the second device and the other devices with access to the at least one first device local file, for disassociating at least one of the first device, the second device and the other devices from the first file system, for associating a third device with the first file system.

21. The system as set forth in claim 15 wherein the at least one file comprises a first file stored on at least one of the first device, the second device and one of the other devices, and the at least one file further comprises a second file stored on at least one of the first device, the second device and the one other device that does not store the first file, the first file and the second file having an identical file name, the first device renaming at least one of the first file and the second file to resolve a file name conflict.

* * * * *

UNITED STATES PATENT AND TRADEMARK OFFICE
CERTIFICATE OF CORRECTION

PATENT NO. : 7,549,047 B2  Page 1 of 1
APPLICATION NO. : 10/301931
DATED : June 16, 2009
INVENTOR(S) : Balfanz et al.

It is certified that error appears in the above-identified patent and that said Letters Patent is hereby corrected as shown below:

Title page at (73) Assignee: delete "Xerox Corporation, Norwalk, CT (US)" and insert --Palo Alto Research Center, Incorporated, Palo Alto, CA (US)-- in its place.

Signed and Sealed this

Eleventh Day of May, 2010

David J. Kappos
*Director of the United States Patent and Trademark Office*